United States Patent [19]

Sakai et al.

[11] 4,031,439

[45] June 21, 1977

[54] OVER-SPEED PREVENTING APPARATUS FOR DC MOTOR

[75] Inventors: Yoshio Sakai; Toshiaki Kurosawa, both of Katsuta, Japan

[73] Assignee: Hitachi, Ltd., Japan

[22] Filed: July 11, 1975

[21] Appl. No.: 595,365

[30] Foreign Application Priority Data

July 19, 1974 Japan .............................. 49-82215

[52] U.S. Cl. .............................. 318/338; 318/350; 318/356; 361/51; 361/31

[51] Int. Cl.² .............................. H02P 7/06

[58] Field of Search .......... 318/350, 356, 338, 465, 318/521, 532; 317/13 B

[56] References Cited

UNITED STATES PATENTS

| | | | |
|---|---|---|---|
| 3,388,306 | 6/1968 | Koppelmann | 318/338 X |
| 3,611,098 | 10/1971 | Fair | 318/338 |
| 3,777,240 | 12/1973 | Neill | 317/13 B |
| 3,811,079 | 5/1974 | Tashiro et al. | 318/356 X |

Primary Examiner—B. Dobeck
Attorney, Agent, or Firm—Craig & Antonelli

[57] ABSTRACT

An over-speed preventing apparatus for the DC motor comprises a DC motor the speed of which is controlled by the adjustment of the armature voltage thereof, controlled-rectifier means for supplying power to the separately excited field winding of the motor, means for generating a predetermined field current command, means for detecting the field current, and a constant current control system for controlling the rectifier means in accordance with the error between the field current command and the detected value of the field current. The apparatus further comprises a unidirectional element connected in parallel to the field winding in the direction in which the field current is made to flow back, current decrease detector means inserted between the rectifier circuit and the parallel circuit including the field winding and the unidirectional element, and protecting means energized by the current decrease detector means.

8 Claims, 1 Drawing Figure

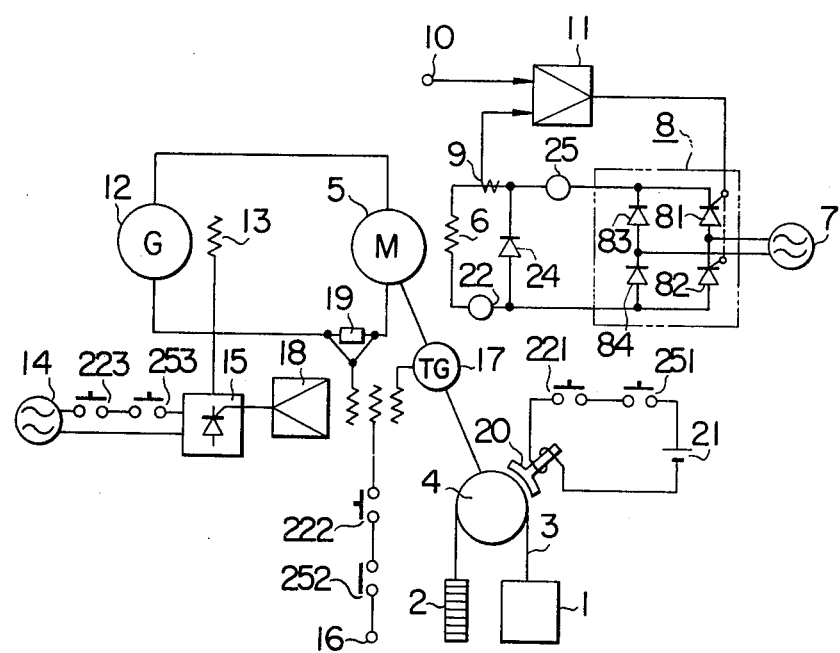

OVER-SPEED PREVENTING APPARATUS FOR DC MOTOR

The present invention relates to an apparatus for preventing the over-speeding of a DC motor which takes place due to loss or decrease of the current flowing in the separately-excited field winding of the DC motor.

The DC elevator employs the Ward-Leonard system in which the output voltage of the Leonard generator is regulated by adjusting the field system thereof, thereby controlling the motor speed, namely, the elevator speed. In view of the excellent riding comfort and the very high accuracy of floor arrival required of the elevator, a speed control system is carefully constructed so as not to be subjected to external disturbances.

One of the external disturbances is an increase in the temperature of the motor. Variations in the constants of the motor due to the increase in temperature cause deteriorated riding comfort and an increased error of floor arrival.

Therefore, a conventional DC motor for elevator has been made to have an ample margin and so large a capacity as to allow only a small rise in temperature.

A small rise in temperature is advantageous also for the field system of the DC motor so that the effect of the fixed field system is sufficiently displayed by supplying power from an AC power supply merely through a rectifier circuit.

As a result, the field circuit is not required to be controlled and is strongly constructed, and therefore it can be said that there is no danger of accident. Even in this case, however, providing against an emergency in view of the elevator carrying passengers, about 90% or more current flowing in the field winding is required as one of the operating conditions.

The recent improvement in the speed control system has made it possible to secure a satisfactory accuracy in floor arrival and riding comfort as against the rise in the temperature of the motor. Such a speed control system, which will not be described here in detail since it is not directly related to the invention, has a pre-requisite that the field current does not vary in the presence of the rise in the temperature of the motor.

Power supplying merely by means of a rectifier circuit, however, causes a great change in the field current and in turn the field electromotive force, in spite of the output voltage of the rectifier circuit being constant, because the resistance variation of the field winding due to a temperature rise is large. For this reason, the rectifier circuit has come to be made controllable by the use of a thryristor and thus a constant current control system has been employed.

When a controllable semiconductor element such as a thyristor and a control device for controlling the semiconductor element are used in the field circuit, it must be taken into consideration to protect such devices from trouble. When the field current is lost by an erroneous firing of the thyristor, for instance, the DC motor, namely, the elevator is dangerously suddenly increased in speed.

An object of the present invention is to provide an over-speed preventing apparatus for a DC motor by quickly and accurately detecting the failure of the field circuit.

The present invention is characterized in that a flowback unidirectional element such as a diode is connected in parallel with the field winding and that a current reduction detecting means is connected in series with the parallel circuit and the rectifier circuit.

By so constructing the system the current flowing in the field winding is gradually decreased as it flows back through the above-mentioned parallel-connected diode, in the case of an accident wherein the output voltage of the rectifier circuit is lost or extremely reduced. Also, since the current in the current reduction detecting means is sharply reduced or lost, the accident is instantaneously detected. Thus, it is possible to operate a protecting device for emergency de-energization of the apparatus.

The diode connected in parallel to the field winding is not expensive and the only other component element to be added is the current reduction detecting means such as a current relay which is available on the market. So, there is no need for the fabrication of a special detecting device, thus making it possible to construct the apparatus simply and with low-cost.

According to the present invention, there is provided an over-speed preventing apparatus for a DC motor comprising a DC motor and rectifier means for supplying power to the separately-excited field winding of the DC motor, the apparatus further comprising a unidirectional element connected in parallel to the field winding, current reduction detecting means connected in series between the parallel circuit and the rectifier circuit, and a protecting device operatively interlocked with the current reduction detecting means.

The above and other objects, features and advantages will be made apparent by the following detailed description taken in conjunction with the accompanying drawing.

The single FIGURE of drawing is a schematic circuit diagram showing the construction of the over-speed preventing apparatus for a DC motor according to an embodiment of the present invention.

The conventional over-speed preventing apparatus and the over-speed preventing apparatus according to the invention for a DC motor will be described below with reference to the accompanying drawing.

The elevator cage 1 and the counter-weight 2 are hung from the sheave 4 by the rope 3 in a similar form to a well-bucket. The sheave 4 is connected through a gear or directly to the armature 5 of a DC motor. The separately-excited winding 6 of the DC motor is supplied with power from the AC power supply 7 through a controlled rectifier circuit 8. The controlled rectifier circuit 8 is what is called a hybrid bridge circuit comprising a pair of thyristors 81 and 82 and a pair of diodes 83 and 84. The field current is detected by the current transformer 9 and compared with a current command value applied to the terminal 10 by the phase shifter 11 comprising a magnetic phase shifter and having dual function of comparison and amplification. A constant current control system is thus constructed to operate in such a manner as to lessen the deviation between the two values compared.

The armature 5 of the DC motor, on the other hand, is connected to the armature 12 of the DC generator and makes up the Ward-Leonard system. The field winding 13 of the generator is supplied with electric power by the AC power supply 14 through the controlled rectifier circuit 15. The rectifier circuit 15 has a similar construction to the above-described rectifier circuit 8 and contains in it a thyristor. An example of the speed control system for the elevator utilizing the above-mentioned thyristor is constructed as described below.

First, a speed command voltage is applied to the terminal 16 and compared with the output of the speed generator 17 detecting the speed of the DC motor, that is, the speed fo the elevator. Reference numeral 18 shows a phase shifter having a function similar to that of the aforementioned phase shifter 11 and controls the phase of the thyristor of the rectifier circuit 15 in such a manner as to reduce the speed deviation to zero. Incidentally, for the purpose of load compensation, the current in the armature circuit is collected from across the resistor 19 and positively fed back to the phase shifter 18.

Numeral 20 shows an electromagnetic brake excited by the DC power supply 21. This electromagnetic brake is provided for holding the mechanical system by cutting off the DC power supply 21 at the time of floor arrival of the elevator. Other component elements not required for the explanation of the present invention are not shown in the drawing. Therefore, there are of course actually added a number of component elements not shown in the drawing.

Apart from the brief description of the construction of the speed control circuit of the DC elevator, the coventional over-speed preventing apparatus will be described below.

The current relay 22 connected in series with the field winding 6 is energized with substantially 90% of the normal field current. The turning-off current of the current relay 22, on the other hand, is approximately 45%. Therefore, so far as the field current is not more than 90% of the rated value thereof, the contacts 221 to 223 are open and so the operation of the elevator is locked by means of the electromagnetic brake 20. At the same time, the speed command is cut off and also the power supply 14 for the field system of the generator is disconnected. Thus the elevator is safely prevented from being started.

Once the elevator is started, however the current relay 22 will not be turned off until the field current is reduced to about 45% as explained above. Even in the case where the field current is reduced for some reason, therefore, such a reduction is not detected, allowing the DC motor to run at over-speed. Also, in the event that the output voltage of the rectifier circuit 8 is reduced to zero, the current relay 22 will not be operated immediately. This is because the field winding 6 is commonly provided with a flow-back route including such elements as the diodes 83 and 84, in order to obtain a smooth current flowing therein, and therefore it is some time before the field current is reduced down to about 45%. In the meantime, the DC motor is subjected to field-weakening control and excessive speed.

An alternative method has been suggested in which the voltage across the field winding 6 (the output voltage of the rectifier circuit 8) is detected so that the reduction of the voltage causes a protecting device to be operated. According to this method, any extinction of the output voltage of the rectifier circuit 8 is detected immediately by a voltage relay thus preventing the over-speed of the motor.

The above-mentioned method, however, has a decided disadvantage as mentioned below and can not be used in practice.

It was already explained that the temperature rise of the motor causes the resistance value of the field winding to be sharply changed. In view of the fact that a constant current is supplied from the constant current system, the output voltage of the rectifier 8 is also subjected to changes in proportion to the variations of the winding resistance. This change is such that the voltage at high temperatures becomes 1.5 times as high as at low temperatures. Therefore, it is very difficult to set an off voltage or detection voltage capable of proper detection of a failure of the appartus.

A preferred embodiment of the present invention shown in the drawing will be explained below.

A diode 24 is connected in parallel with the field winding 6, and a current relay 25 is provided at a position in series wih the parallel circuit.

First, under normal conditions, both the make-contacts 221 to 223 and 251 to 253 of the already-described current relay 22 directly connected in series with the field winding 6 and the current relay 25 added by the present invention are closed.

Next, suppose an accident has taken place in which the thyristors 81 and 82 become unable to conduct by being broken, or no gate pulse can be produced by a failure of the phase shifter 11, thereby cutting off the power supply to the field winding 6.

In such a case, the inductance in the field winding 6 causes the field current to flow in the closed loop from the element 6, through relay 22 an diode 24, to winding 6, and thus the field current is not instantly extinguished. As a result, as mentioned above, the current relay 22 with its off current of 45% is not likely to be turned off soon.

The current at the output side of the rectifier circuit 8, however, is brought to zero imediately. Therefore, the current relay 25 is turned off immediately following the occurrence of the failure. The make contacts 251 to 253 thereof are opened instantly, and the elevator is stopped instantly by the release of the electromagnetic brake 20. At the same time, the speed command terminal 16 is disconnected, and the power supply 14 for the generator field system 13 is cut off, thus enabling the power to the motor 5 to be cut off. The protecting means for preventing the over-speed of the motor may be considered in various other forms and they are collectively called the protecting means for the purpose of the present specification.

With the complete extinction of the field current, the current relay 22 is also turned off, thus opening the contacts 221 to 223. If the operation of the protecting means is delayed until the turning off of the current relay 22, the DC motor 5 and in turn the elevator is sped excessively by the field-weakening control caused in the meantime; but such an unfavorable situation is prevented by the invention.

Since the diode 24 is inserted in the embodiment under consideration, the controlled rectifier circuit 8 may be constructed in other form than shown in the drawing. In other words, even though the current flowing into the field winding 6 from the AC power supply 7 pulsates by the phase control of the thyristors 81 and 82, the electromagnetic energy in the field winding acting against the possible tendency of reduction in the current flowing in the field winding 6 causes a current to flow in the closed loop of from the element 6, through relay 22 and diode 24, to winding 6, thus preventing the pulsation of the field current. Therefore, the series connection of the diode 83 and 84 in the rectifier circuit 8 are not required. Instead, all the elements of the rectifier circuit 8 may be comprised of thyristors, or alternatively, thyristors may be arranged at the positions of the elements 81 and 83 (or 82 and 84) while disposing diodes at the positions of the elements 82 and 84 (or 81 and 83) thereby to form a hybrid bridge.

The present invention is also applicable to the case where power is supplied to the field winding of the DC motor through a rectifier circuit using no thyristor, for instantly detecting a failure of the rectifier circuit such as a breakdown of the diode.

It is for the reason explained below that the current relays 25 and 22 are both used in the embodiment under consideration.

It is desired that the current relay 25 used as the current reduction detecting means is turned off when the current is cut off even for a short period of time of about half cycle of the AC power supply 7 so that various failures of the rectifier circuit 8 may be detected. The current relay having such a function is turned on at approximately 65% of the rated current if it flows continuously.

In an application of a DC motor to an apparatus for carrying persons such as an elevator, it is required to make sure at the time of starting it that approximately 90% of the field current flows. Notwithstanding, the current flowing at the position where the current relay 25 is inserted does not indicate the exact value of the current flowing in the field winding.

For this reason, the current relay 22 which is turned on with 90% of the field current should preferably be inserted at a position where the field winding current is capable of being detected directly.

By this construction, at the time of starting the motor, the operator is thus able to begin to run the motor while making sure that the field current of not less than 90% of the rated current is flowing and that there is no failure of the power supply for the field system. After that, the cut-off of the current flowing in from the power supply is instantly detected, thus making it possible to detect quickly any failure of the power supply. The protecting means are then operated to stop the motor or allow to take other appropriate measures.

What is claimed is:

1. An over-speed preventing apparatus for a DC motor comprising a DC motor having a field winding and rectifier means including a rectifier circuit for supplying power to separately excite the field winding of said DC motor; said apparatus further comprising a unidirectional current conducting element connected in parallel to said field winding, current reduction detecting means connected in series between said parallel circuit, formed by said unidirectional current conducting element and said field winding, and said rectifier circuit for detecting reduction of the current therethrough to below a prescribed level, and protecting means responsive to said current reduction detecting means for preventing over-speed operation of said DC motor.

2. An over-speed preventing apparatus according to claim 1, in which said rectifier circuit includes thyristor, and wherein the voltage of said rectifier means is controllable.

3. An over-speed preventing apparatus according to claim 2, further comprising constant current command means for producing a constant current command value, field current detecting means for detecting the value of said field current, and phase shifter means for effecting phase control of said thyristor in accordance with the difference between the constant current command value produced by said constant current command means and the detected value of the field current.

4. An over-speed preventing apparatus according to claim 1, further comprising means for generating a speed command, means for generating a speed signal indicative of the actual speed of said motor, and means for controlling a voltage applied to the armature of said motor in accordance with the difference between said speed command and said speed signal.

5. An over-speed preventing apparatus according to claim 1, further comprising means for detecting a current of more than a predetermined value flowing in the field winding, and means for enabling the starting of said motor in response to the output of said detecting means.

6. An over-speed preventing apparatus according to claim 5, in which said curent detecting means is inserted in a closed loop including said field winding and said unidirectional element.

7. An over-speed preventing apparatus according to claim 1, further comprising a sheave mechanically connected with said motor, and an elevator cage and a counterweight hung on said sheave by a rope.

8. An over-speed preventing apparatus according to claim 1, wherein said unidirectional element is a diode.

* * * * *